000
United States Patent [19]

Bach et al.

[11] 4,039,917
[45] Aug. 2, 1977

[54] ON-OFF SERVOCONTROLLER GENERATING A PULSE-DURATION-MODULATED ERROR-COMPENSATING SIGNAL

[75] Inventors: Bernhard Bach; Ernst Picmaus, both of Frankenthal, Pfalz, Germany

[73] Assignee: Klein, Schanzlin & Becker Aktiengesellschaft, Frankenthal, Pfalz, Germany

[21] Appl. No.: 460,457

[22] Filed: Apr. 12, 1974

[30] Foreign Application Priority Data

Apr. 13, 1973 Germany .................. 2318696

[51] Int. Cl.² ........................................... G05B 11/28
[52] U.S. Cl. .................................... 318/599; 318/610
[58] Field of Search ............................ 318/599, 610

[56] References Cited

U.S. PATENT DOCUMENTS

| | | | |
|---|---|---|---|
| 3,131,340 | 4/1964 | Johnson et al. | 318/599 |
| 3,505,606 | 4/1970 | Werner | 318/599 X |
| 3,639,824 | 2/1972 | Malavasi | 318/599 |
| 3,665,500 | 5/1972 | Lewis et al. | 318/599 X |
| 3,745,420 | 7/1973 | Hafner | 318/599 X |
| 3,874,407 | 4/1975 | Griswold | 318/599 X |

*Primary Examiner*—B. Dobeck
*Attorney, Agent, or Firm*—Michael J. Striker

[57] ABSTRACT

A servosystem is comprised of an energy-storing controlled system having an output variable which is to be maintained at a predetermined value. An energy-varying unit, for example a source of electrical energy, is connected to the controlled system for energizing the latter. Alternatively, the energy-varying unit could be operative for removing energy from the controlled system. A two-mode control unit is operative in the first mode thereof for causing the energy-varying unit to effect a change in the energy stored by the controlled system, and is operative in the second mode thereof for preventing the energy-varying unit from effecting such change. An error-indicating unit is operative for generating an error signal indicative of the deviation of the output variable of the controlled system from the predetermined value to be maintained. A pulse-duration-modulating circuit is connected to the error-indicating means for receiving the error signal and for applying to the two-mode control unit an error-signal-dependent pulse-duration-modulated actuating signal whose dependence upon the error signal is such that increases in the deviation indicated by the error signal result in superproportional increases in the effective value of the actuating signal. In other words, if the deviation is plotted along the horizontal axis and the effective value of the pulse-duration-modulated actuating signal is plotted along the vertical axis, the resulting curve will be of increasing slope.

10 Claims, 3 Drawing Figures

ON-OFF SERVOCONTROLLER GENERATING A PULSE-DURATION-MODULATED ERROR-COMPENSATING SIGNAL

BACKGROUND OF THE INVENTION

The invention relates to a servocontroller which controls a system comprised of energy-storing elements, the controller being operative for controlling the controlled system by generating a pulse-duration-modulated actuating signal which actuates a two-position control element whose positions have a substantially delay-free effect upon the controlled system itself, but only a delayed effect upon the value of the output variable of the controlled system, be it position, temperature, pressure, velocity, or the like.

Some controlled systems exhibit the characteristic that the value of the output variable of the controlled system tends to decrease in response to external factors. For example, in the case of a heat-storing controlled system, if heat is not supplied to the controlled system, loss of heat occurs, and the output variable of such controlled system (i.e., temperature) will tend to decrease. When this is the case it is a common expedient to control the contolled system by means of a servocontroller which is operative only for initiating and terminating the supply of energy to the controlled system, it being unnecessary for the controller to remove energy from the controlled system, since loss of energy from the control system will occur by itself, when the controlled system is not receiving energy under the action of the controller. A thermostat-type on-off controller is a familiar example of this type of controller. However, there are many other controllers of this type.

Such controllers are operative for effecting intermittent supply of energy to the energy-storing controlled system at an average rate sufficient to counteract the continual loss of energy which occurs even in the steady state.

If such a servocontroller is to perform well, it is theoretically desired that the supply of energy to the energy-storing controlled system should be automatically varied in immediate response to changes in the energy input rate actually required to maintain the output variable of the controlled system at the desired value; i.e., the servocontroller should ideally be a direct (delay-free) controller immediately responsive to undesired changes occurring within the controlled system.

However, because of the presence of energy-storing elements within the controlled system, the initiating and termination of the supply of energy to the controlled system by the controller must take into account the dynamic behavior of the controlled system, namely the behavior of the controlled system during an automatic servocompensation operation, thereby complicating the realization of ideal control action.

In this connection, particular care must be taken when the controlled system exhibits substantial dead time. For example, if the output variable of the controlled system has the desired value and the controlled system is in fact in the proper state of energization, a departure from such proper state of energization will result in a corresponding change in the value of the output variable of the controlled system, thereby initiating renewed supply of energy to the controlled system. The energization of the controlled system proceeds until a time when enough energy has been furnished; however, there may be a substantial dead time before the output variable of the controlled system reassumes the desired value.

With on-off servocontrollers the existence of a dead time of this sort has a marked effect upon overall system performance. With on-off servocontrollers, the dead time results in the termination of energy supply to the controlled system than is theoretically desirable; in theory, the supply of energy should be initiated in immediate response to the development of an energy requirement in the controlled system and should be terminated in immediate response to the successful filling of the energy requirement.

In case of such dead time, the energizing pulse will be somewhat too long, the excess in the duration of the energizing pulse being substantially constant, independent of the duration of the energizing pulse. In other words, the absolute value of the excess duration of the energizing pulse will be the same for both short-duration and long-duration pulses. Clearly, in the case of long-duration energizing pulses the excess duration will represent only a small percentage of the total pulse duration; however, in the case of short-duration energizing pulses, the excess duration will represent a much larger and possibly very significant percentage of the total pulse duration.

The longer-duration energizing pulses are associated with greater descrepancies between the desired and actual values of the output variable of the controlled system; the shorter-duration energizing pulses are associated with smaller discrepancies between the desired and actual values of the ouput variable of the controlled system. This results in servocontroller performance different from what is usually desired. It is usually desired that the actuating or compensating signal increase with increasing system error, and decrease with decreasing system error; usually it is desired that the actuating or compensating signal have a magnitude which is substantially proportional to the controlled system error. If the servocontroller operates in an on-off manner, and if the actuating or compensating signal has the form of a pulse-duration-modulated pulse train applied to a two-position control element such as a relay switch or a solenoid valve, then the effective value of the actuating or compensating signal is the ratio of the ON-time to the OFF-time of the pulse-duration-modulated pulse train.

In such an on-off controller with pulse-duration-modulated actuating signal, the dead time discussed above results in system performance which is sub-proportional (degressive). Specifically, the ratio between, on the one hand, the effective value of the actuating signal and the system error is not constant, as would be the case in an ideal proportional control system, but instead decreases as the system error increases (it is to be recalled that the "effective value of the actuating signal" has been defined above as the ratio of the On-time to the OFF-time of the pulse-duration-modulated actuating signal).

This sub-proportional (degressive) system performance results, as should be clear from the above explanation, when a proportional-acting servocontroller of the type employing a pulse-duration-modulated actuating signal to actuate a two-position control element is used to control a controlled system having a substantial dead time. Nevertheless, there are important advantages in the use of a servocontroller of the type employing a pulse-duration-modulating actuating signal. These advantages include the possibility of using a simple two-position control element in place of a continuously operable servomotor, of course in place of a simple two-position control element such as a relay switch or solenoid valve, used could be made of an electronic switch, to which the term "two-position control" element likewise applies, as used herein.

An additional advantage of an on-off servocontroller which generates a pulse-duration-modulated actuating signal to actuate a two-position control element lies in the fact that, automatic servocompensation operations can often be performed very quickly, because of servocontroller connects the controlled system directly to the energy source, so as to always furnish energy at the maximum possible rate so long as the source remains applied. Another advantage is that the pauses between the successive energizing pulses give the controlled system time to react to the supply of energy. The reaction of the controlled system during the pause following an energizing pulse will actually tend to have an effect upon the duration of the next-following energizing pulse; this is desirable because it results in more accurate control. Also, as is well known, the existence of the energy-storing elements in the controlled system combined with properly selected frequency ranges for the pulse-duration-modulated actuating signal (namely frequency ranges that are sufficiently high) results in a system performance which closely approximates to that of servocontrollers of the continuously-acting type.

As discussed at some length above, the controlled system may exhibit a substantial dead time. An example of this would be the following: A sealed container containing a plurality of chemical reactants which are to be precisely maintained at a predetermined constant temperature, with the sealed container including an electrically energizable heat-dissipating element such as a heating coil, and the container further including a temperature-detecting element also located in the container spaced from the heating coil so as to be responsive not so much to the temperature of the heating element but instead, as is desired, responsive more to the average temperature of the substances to be maintained at the constant temperature. If, due to loss of heat from such system, the average temperature of the liquid in the container decreases, such decrease in the average temperature is detected by the temperature-responsive transducer almost immediately. If in response to detection of the undesired temperature decreases a pulse of current is passed through the heating coil, the temperature of the heating coil may rise almost immediately to a greatly increased temperature, and after elapse of the dead time the heating coil and the heated fluid come into thermal equilibrium, perhaps restoring the liquid temperature to the desired value, which fact is then detected by the temperature-responsive element in the fluid. In other words, the first heating pulse just mentioned resulted in the supply of enough heat energy to the controlled system (container plus heating coil plus liquid) to eventually reduce to zero the system error; however, the aforedefined dead time elapses before the system comes into thermal equilibirum and the system error actually returns to zero.

If, to control a system such as the exemplary one just described, use is made of a direct servoncontroller of the type generating a pulse-duration-modulated actuating signal, and if the servocontroller has a porportional performance (effective value of pulse-duration-modulated actuating signal is proportional to detected system error), then the overall performance of the servocontroller and the controlled system will be degressive, as explained above. Such degressive performance requires either a large proportinal range or a substantial limitation of the range of value of the actuating signal. The result is unsatisfactory, because the steady-state system error will be too large.

It is known to overcome this disadvantage by making use of a pulse-duration-modulating servocontroller whose performance is proportional-plus-integral. The integral action time of such proportional-plus-integral servocontroller will be selected in correspondence to the dead time of the controlled system. However, since with this expedient the development of the error-compensating actuating signal is markedly delayed, the overall regulating action is sluggish. The effective value of the pulse-duration-modulated actuating signal changes only slowly, and accordingly if a system error develops the servocontroller does not then counteract such system error in the quickest possible way. Also, the dead time of the controlled system causes the change of polarity of the effective value of the actuating signal to occur too late, namely too late by the amount of such dead time, and this action can lead to excessive overshoots and excessively oscillatory performance. Also, such a servocontroller continually produces changes in the phase shift to the actuating signal, and this creates a tendency for the system to oscillate excessively. Accordingly, when such a controller is used to control such a controlled system, the proper adjustment of the operating parameters of the servocontroller is very critical, and not easy to perform. Correct selection of the parameter values and matching of the controller and controlled system performance is a costly process. Also, the possibility of incorrect design is very great.

SUMMARY OF THE INVENTION

It is an object of the invention to provide a control arrangement similar to the types described above, but not characterized by the above-discussed disadvantage, and instead characterized by a quicker reaction time and accordingly a lesser tendency to exhibit an oscillatory response.

This object can be met, according to one advantageous concept of the invention, by making use of a servocontroller which generates a pulse-duration-modulated actuating signal which actuates a two-position control element operative for alternately initiating and terminating energization of the controlled system (or instead, alternately initiating and terminating removal of energy from the controlled system, if the controlled system is of the type in which there is normally an undesired build-up of energy which must be counteracted by the servocontroller).

The invention seeks to provide a total system (controller plus controlled system) which as to the extent possible the characteristics of a direct or delay-free servocontroller, for instance a simple proportional-acting controller, the effective value of whose error-correcting actuating signal is dependent substantially exclusively on the actual energy requirements of the controlled system. The invention also takes into account the consideration that with a closed-loop servocontroller the steady-state controlled system error is to some extent an expression of the effect of the disturbance variable (in the case of the sealed container of fluid, offered above as an example of a controlled system with dead time, the disturbance variable is heat loss to the external environment). The invention makes use of these considerations, and associates with each value of the controlled system error a certain slope in the servocontroller performance curve. The servocontroller performance curve is a curve wherein the magnitude of the controlled system error is plotted along the horizontal axis, and along the vertical axis there is plotted the value of the error-correcting actuating signal. In the case of a pulse-duration-modulated actuating signal, the effective value of the actuating signal is the ratio between the ON-time and the OFF-time of the actuating signal. According to the invention, this performance curve will have a progressive, as opposed to a degressive, character. In other words, the value of the actuating system will rise with increasing controlled system error, but not merely proportionally, but more steeply, and with a continually increasing slope. It has already been explained that, in the case of a controlled system having a dead time the effect on the controlled system of the PDM actuating signal produced by a proportional-acting controller is degressive; i.e., as the controlled system error increases, the effect of the error-correcting actuating signal does not continue to rise proportionally, but is instead degressive. According to the invention, the pulse-duration-modulating on-off servocontroller having a progressive performance curve, when used to control such a controlled system results in a substantial linearization of the relationship between the controlled system error and the value of the error-correcting actuating signal, which is necessary for stable regulating action.

The pulse-duration-modulating servocontroller according to the invention has some of the advantages of a self-adaptive servocontroller. In the case of an ordinary proportional-acting servocontroller, having a performance curve with a constant slope, the constant slope must be selected taking into account the characteristics of the controlled system, in order to avoid the possibility of system instability. However, in the case of a self-adaptive servocontroller having a progressive performance curve each value of the controlled system error is associated with a section of the performance curve having a slope which is still low enough to avoid system instability. In the event of over-regulation, the consequently decreasing system error effects a shift of the servocontroller dynamic operating point onto a section of the performance curve having a lower slope; if the controlled system error is too large, the dynamic operating point is shifted to a curve section having a larger slope. The initial adjustment of the servocontroller is accordingly non-critical, and it is possible to select an essentially smaller range for the controlled-system-dependent signal applied to the input of the pulse-amplitude-modulating servocontroller.

According to one advantageous concept of the invention, the servocontroller is comprised of a servoamplifier having an input which receives an error signal indicative of detected system error. The servoamplifier furthermore has a feedback branch, connecting its output to its input and operative for feeding back the output signal of the servoamplifier to the input thereof with a time delay, in order to cause the output signal of the servoamplifier to be a pulse-duration-modulated actuating signal. This pulse-duration-modulated actuating signal is used not only to control the two-position control element, but also to control a switchover member (such as a two-positon switch or the electronic equivalent) connected in the feedback branch and operative, in dependence upon the polarity or amplitude of the pulse-duration-modulated actuating signal, for changing the conductance value of the feedback branch or the value of the feedback signal and its polarity in a sense counteracting the error signal applied to the servoamplifier input.

It is known to cause a proportional acting servocontroller to generate a pulse-duration-modulated actuating signal by introducing a time-delay stage or component into feedback branch of the servoamplifier. The resulting performance curve of the pulse-duration-modulating servocontroller is quite linear. According to the invention, the performance curve of the servocontroller is made not linear, but instead progressive (increasing slope) by changing the time delay associated with the transmission of a feedback signal through the feedback branch. In order to effect a change of the servoamplifier gain, the time constant of the time-delaying feedback branch of the servoamplifier is given two different values. In dependance upon the amplitude of the pulse-duration-modulated actuating signal, the feedback branch of the servoamplifier is caused to have either the short time constant with the high servoamplifier gain, or the long time constant with the low gain. The switchover back and forth between these two servoamplifier feedback-branch time constants occurs in conjunction with a switchover of the polarity of the feedback signal such as will counteract the effect of the error signal applied to the servoamplifier input. The two time constants of the servoamplifier feedback branch simulate the ratio between the charging and discharging time constants of the controlled system, so as to result in a servocontroller performance curve having a progressive character, in contrast to the degressive character of the input-output performance curve of the controlled system. In order to achieve this, during the supply of energy to the controlled system the feedback branch of the servoamplifier exhibits the short time constant, and during the intermediate pause while energy is not being supplied to the controlled system the feedback branch of the servoamplifier exhibits the long time constant.

The invention makes use of the fact that the effective value of the pulse-duration-modulated actuating signal has a substantially immediate effect upon the furnishing of energy to the controlled, system, and the two-position control element which is controlled by the pulse-duration-modulated actuating signal (for example an electromagnetic relay or the electronic equivalent) need not be altogether free of hysteresis in its operation. In fact the change back and forth between the two time constants in the feedback branch of the servoamplifier can even result in a substantially complete counteracting of the hysteresis in the operation of the two-position control element.

A particularly simple and reliable two-time-constant feedback network is comprised, according to one advantageous concept of the invention, of a plurality of resistors of which one or more are connected up-circuit of the time-delay capacitor of the feedback branch (up-circuit in the sense of being nearer the servoamplifier output than is the time-delay capacitor), with a diode bridging one of the resistors and serving as the time-delay-selecting switchover element, the diode polarity being so selected that, when the two-position control element is activated to initiate energy supply to the control system, the switchover diode becomes conductive to thereby short-circuit one of the resistors in the servoamplifier feedback network. In this way, the switchover back and forth between the two time constants fo the servoamplifier feedback network can be performed without the use of mechanical switches.

The servocontrol arrangement according to the invention when employed for the purposes described above tends to result in smaller steady-state controlled-system errors than is usually the case, by reason of the fact that the operating point of the servocontroller (the ratio of the ON-time to the OFF-time when the detected control system error is zero) is in the middle of the range of variation of effective values of the pulse-duration-modulated actuating signal (i.e., the range of values of the just-mentioned ratio). According to one advantageous concept of the invention, the operating point of the servocontroller can be established as desired in the middle of the range of variation of the actuating signal by suitable selection of the forward-bias threshold voltage of the above-mentioned diode, or of the breakdown voltage of a Zener diode if a Zener diode is used instead.

The progressive character of the inventive servocontroller can be further increased by including in the servoamplifier feedback network a further coupling capacitor, described more clearly below; this results in the short time constant being even shorter, and is particularly of significance when the controlled system exhibits a long time lag or dead time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
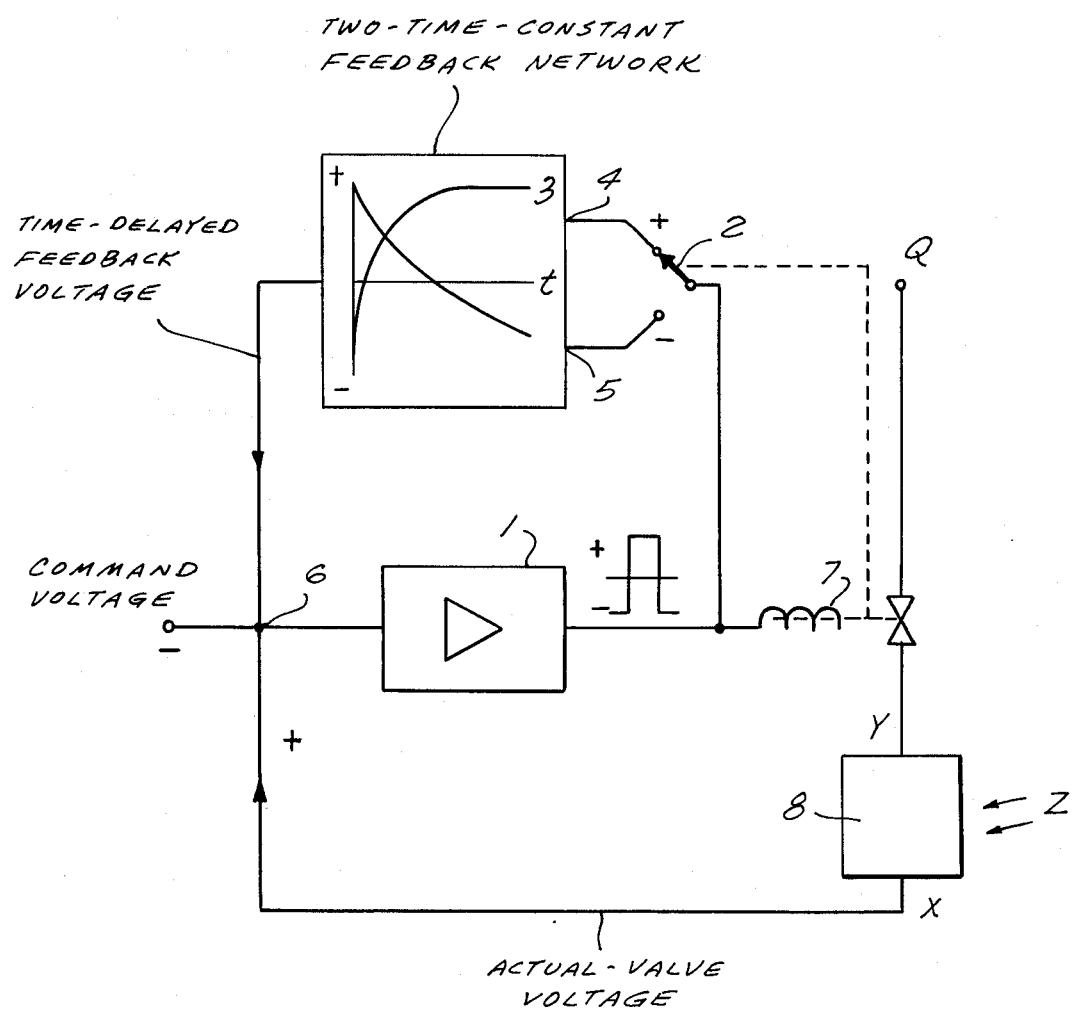
FIG. 1 depicts in block-diagram form a servocontroller according to the invention.

The circuit depicted in FIG. 1 is comprised of an amplifier 1, a two-position switch 2, and a feedback network 3. The feedback network 3 has a channel 4 for the feeding back of signals via a short-time-constant feedback path, and a channel 5 for the feeding back of signals via a long-time-constant feedback path. The servocontroller shown in FIG. 1 is further comprised of a summing junction 6 and a two-position movable control member 7, here a solenoid valve. In FIG. 1, the controlled system is designated by reference numeral 8. Reference character Y designates the input of the controlled system, X the output thereof, Z the disturbance signal which tends to reduce the magnitude of X, and Q designates the energy source to which the input Y of controlled system 8 is directly connected when valve 7 opens.

Three voltages are algebraically summed at the summing junction 6. The feedback voltage from the output of controlled system 8 has a positive polarity and a magnitude which varies in proportion to the output of the controlled system 8. The command voltage is of negative polarity and has a magnitude which can be adjusted to a value proportional to the desired value of the output of the controlled system 8.

The difference between the command voltage and the actual-value voltage constitutes the error voltage, and is evidently proportional to the detected controlled-system error. Algebraically summed with this error voltage is the time-delayed feedback voltage (described in greater detail below). The sum of all three voltages is applied to the input of servoamplifier 1, and constitutes the servoamplifier input voltage. Amplifier 1 amplifies and inverts the servoamplifier input voltage, and the voltage appearing at the servoamplifier output constitutes the actuating (i.e., error-correcting) signal. This actuating signal is in fact generated in the form of a pulse-duration-modulated pulse train, as will become clearer from the explanation below.

This actuating signal, at the output of servoamplifier 1, is applied to the solenoid of a solenoid valve 7, the solenoid of which also controls the position of relay switch 2. When the actuating signal is of positive polarity, the valve 7 opens, and the switch 2 moves to its illustrated position. As a result, the energy source Q is connected directly to the input Y of the controlled system 8, and the short-time-constant feedback branch 4 is operatively connected to the servoamplifier.

If the actuating signal at the output of servoamplifier 1 is of negative polarity or below a predetermined magnitude, then the long-time-constant feedback channel 5 is connected to the servoamplifier output, and the valve 7 closes. The actuating signal is weakened and is fed from the servoamplifier output back to the input thereof with a polarity such as to counteract the error voltage. Sooner or later, the time-delayed feedback signal either exceeds or falls below the algebraic sum of the command and actual-value voltages, thereby causing a polarity change of the actuating signal at the output of the servoamplifier 1. It will be understood by persons skilled in the art that providing the servoamplifier 1 (e.g., an operational amplifier having differential input) with a time-delay-component-containing feedback branch, causes the actuating signal at the output of the servoamplifier 1 to change back and forth between positive and negative polarity (or back and forth between values above and below a predetermined reference value), so as to cause the actuating signal at the output of servoamplifier 1 to be a pulse train which is pulse-duration-modulated in dependence upon the albebraic sum of the command voltage and the actual-value voltage, this pulse-duration-modulated actuating signal being applied to the solenoid of the solenoid valve 7, in this example, and, according to the inventive concept, also controlling the time-constant of the feedback network 3.

Figure 2:
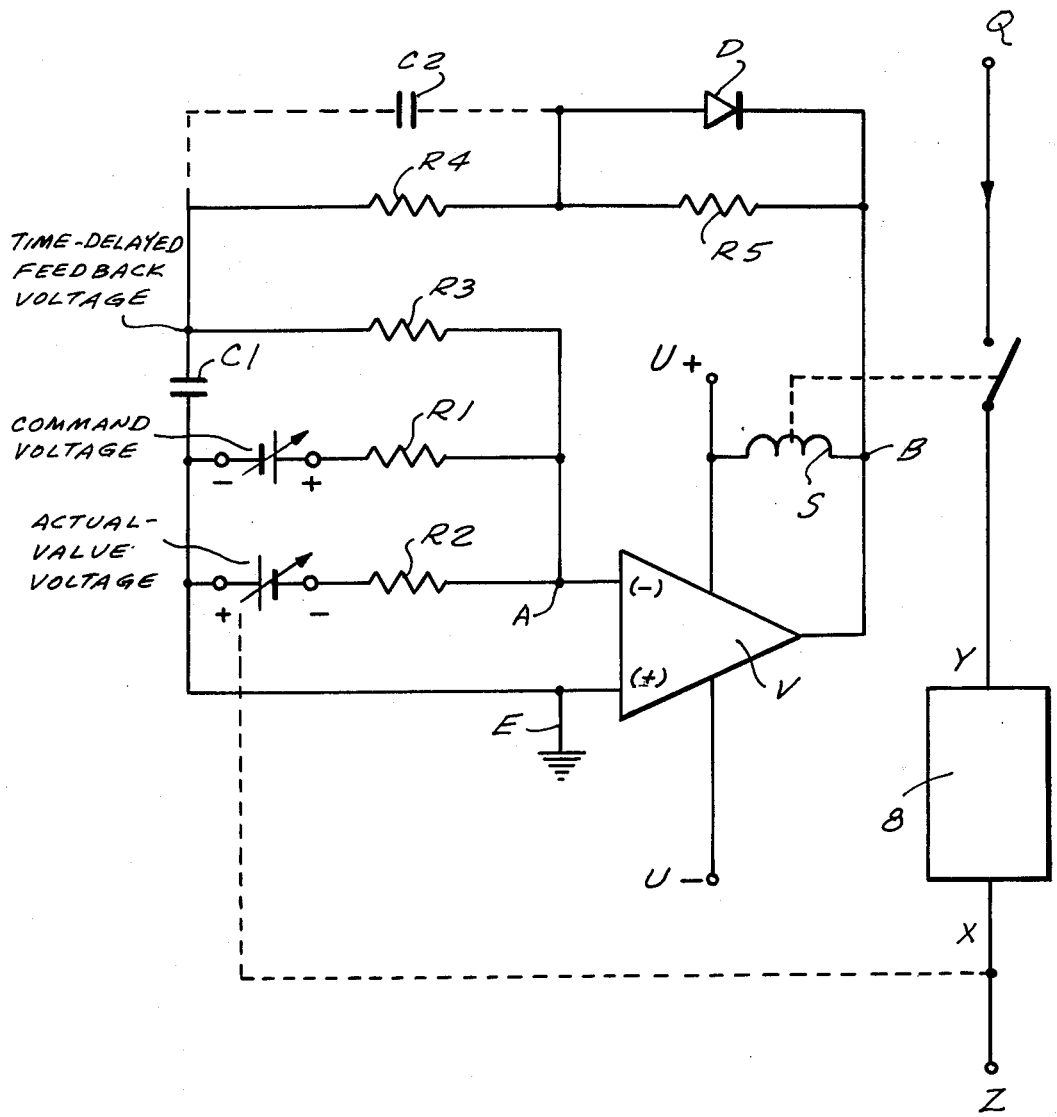
FIG. 2 is a circuit diagram of a servocontroller according to the invention.

FIG. 2 depicts the circuitry of one pulse-duration-modulating on-off servocontroller according to the invention.

The circuit is comprised of an operational amplifier circuit V having an inverting (−) and a non-inverting (+) input, the latter being connected directly to a source of reference voltage, such as ground. Connected to the inverting input of the operational amplifier are three summing resistors R1, R2, R3. The principle of operation of a servoamplifier comprised of an operational amplifier is too well known to require explanation here, except to note that the current from the actual-value voltage transducer (here shown as a variable voltage source mechanically coupled to the output of the controlled system 8) flows through input resistor R2, that the current from the command voltage transducer flows through the input resistor R1, and that the current derived from the time-delayed feedback voltage flows through the input resistor R3. The two-time-constant feedback network is composed of a time-delay capacitor C1, resistors R4 and R5, a diode D serving the purpose of switch 2 in FIG. 1, and an optional feedback capacitor C2 which if used tends to increase the progressive character of the servocontroller performance curve.

In the circuit of FIG. 2, the two-position control element is a relay S. As in FIG. 1, reference numeral 8 designates the controlled system, Q designates the energy source, Y the input of the controlled system, X the output of the controlled system, and Z the disturbance signal which is visualized as a further input signal applied to the controlled system 8.

Persons familiar with operational amplifiers will readily appreciate that circit junction A in FIG. 2 is a summing or comparison junction, corresponding to junction 6 in FIG. 1. When the command voltage (which is of positive polarity) and the actual-value voltage (which is of negative polarity) have the same magnitude, then the only current flowing into the inverting input of the operational amplifier is the current flowing through R3 and derived from the time-delayed feedback voltage.

If the magnitude of the actual-value voltage falls more and more below the magnitude of the command voltage, the voltage at summing junction A will become more and more positive, since the command voltage is of positive polarity. As a result, the actuating signal B at the output of servoamplifier V will become increasingly negative, due to the high gain of the amplifier, until the actuating voltage B assumes almost the bias-voltage value U−. The left terminal of the solenoid of relay S is connected to the positive bias voltage U+, and when the voltage at the right terminal of the relay solenoid goes as low as U−, the solenoid will be energized, and the relay switch will close, initiating supply of energy to energy-storing controlled system 8. Also, the negative actuating voltage B will be fed back to the circuit junction A, via diode D, resistors R4 (and capacitor C2 if the latter is used), and resistor R3.

Figure 3:
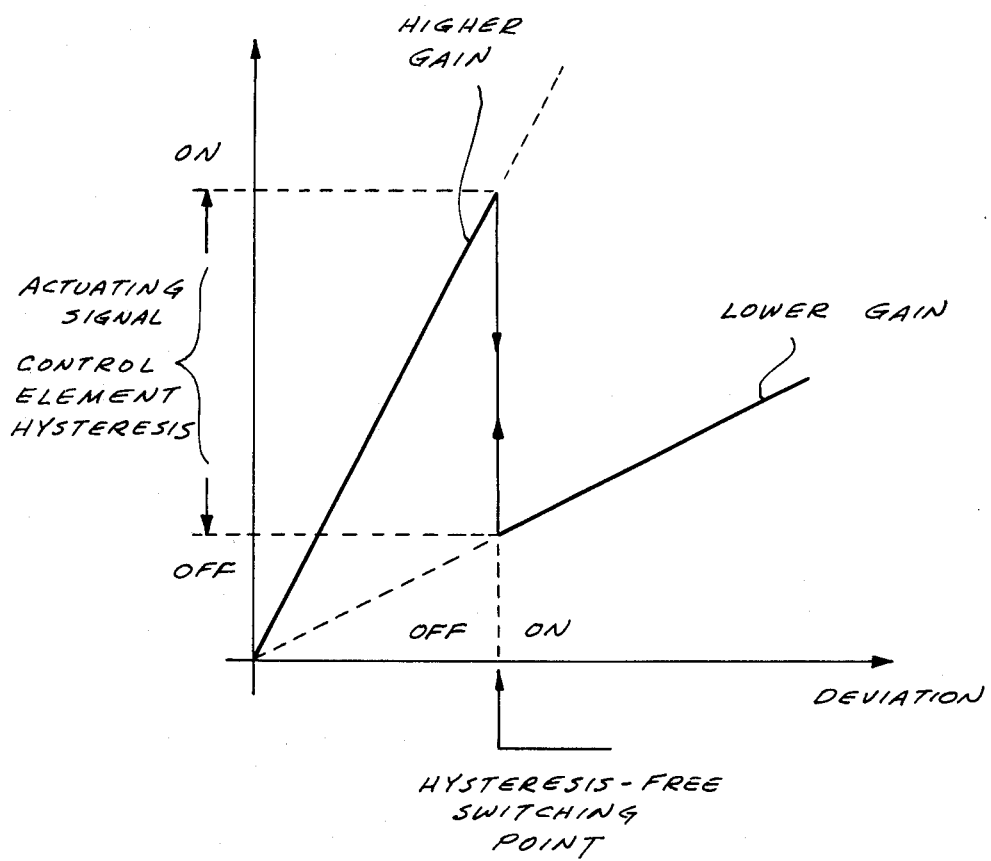
FIG. 3 is a diagram showing the dependence of the actuating signal upon the controlled-system error.

First of all, only the static part of the feedback network will be considered, namely that comprised of resistors R3, R4, R5. These resistors form a negative-feedback branch for the operational amplifier V. When the actuating signal B has a sufficiently negative value, diode D becomes conductive, thereby effectively short-circuiting resistor R5. The gain of the operational amplifier, and accordingly the magnitude of the actuating signal B, will become reduced as a result, it being well known that the gain of an operational amplifier is proportional to the feedback impedance of the operational amplifier. The activated control relay S, according to its switching hysteresis, drops out (the relay switch opens) immediately upon this reduction of the magnitude of actuating signal B, which reduction in magnitude, as just mentioned, results from the gain drop of the operational amplifier. This operation is shown in the graph of FIG. 3. This expedient results in substantially complete compensation of the hysteresis of the control relay S and actually brings the relay to self-energization, since when the relay becomes deenergized the actuating signal B shifts in value towards zero, or even beyond zero to positive values, thereby blocking the diode D, thereby bringing the resistor R5 into the feedback branch of the operational amplifier, and thereby again causing the actuating signal B to become more negative, so as to again actuate the relay S. The reactuation of relay S can in principle be effected solely in response to this automatic reversion of the amplifier gain to the higher value. (Hitherto, infinite amplifier gain has made possible only a reduction in the effect of the hysteresis.) Selecting the forward-bias threshold voltage of the diode D (which of course involves selection of the diode itself) permits an easy establishment of a desired value for the servocontroller operating point inside the range of variation of the actuating signal. In other words, when the command voltage and actual-value voltage exactly cancel each other out, the servocontroller will still generate at its output a pulse-duration-modulated actuating signal the effective value of which (ratio between ON-time and OFF-time) will have a certain predetermined value, for example sufficient to counteract the expected effect of the disturbance variable Z.

The above discussion dealt with the static aspects of the effect of the two-value feedback network, namely the effect on the amplifier gain. If now the time-delay capacitor C1 is inserted, as shown in FIG. 2, the feedback takes on a dynamic character. The feeding back of the actuating signal B to the summing junction A is delayed in time, this delay depending upon the time constant of the feedback network of the operational amplifier. The changeover back and forth between the long and short time constants of the feedback network is performed by the diode D, as described above, by short-circuiting resistor R5 or not. When the actuating signal B is negative, the diode D conductive, and the relay switch closed, the feedback branch time constant will be determined essentially by R4 and C1. When the actuating signal B is insufficiently negative or positive, the diode D non-conductive, and the relay switch open, the feedback-branch time constant will be essentially determined by R4, R5 and C1.

This switchover between a long-time-constant feedback and a short-time-constant feedback, in dependence upon the polarity or magnitude of the actuating signal, has a different effect upon the pulse duration of the actuating pulse B as compared to the pause intermediate successive actuating pulses B. The relationship is not linear but is progressive with the feedback resistor ratio R5:R4. If the coupling capacitor C2 is included in the circuit of FIG. 2, the relationship becomes still more progressive. Use of such a pulse-duration-modulating servocontroller for controlling an energy-storing controlled system exhibiting a marked dead time results in a very great improvement in the system control and results in lesser controlled-system error.

It will be understood that each of the elements described above, or two or more together, may also find a useful application in other types of circuits differing from the types described above.

While the invention has been illustrated and described as embodied in a pulse-duration-modulating on-off servocontroller, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute the essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A servosystem, comprising in combination, an energy-storing controlled system having an output variable which is to be maintained at a predetermined value; energy-varying means operative for effecting a change in the energy stored by said energy-storing controlled system; an on-off control unit operative in the on mode thereof for causing said energy-varying means to effect a change in the energy stored by said controlled system and operative in the off mode thereof for preventing said energy-varying means from effecting such change; error-indicating means operative for generating an error signal indicative of the deviation of said output variable from said predetermined value; and pulse-duration-modulating means connected to said error-indicating means for receiving said error signal and operative for alternately turning said control unit on and off by applying to said on-off control unit an error-signal-dependent pulse-duration-modulated actuating signal whose dependence upon said error signal is such that increases in the deviation indicated by said error signal result in superproportional increases in the ratio of the on-time to the off-time of said pulse-duration-modulated actuating signal, wherein said pulse-duration-modulating means comprises a servoamplifier having an input connected to said error-indicating means for receiving said error signal and having an output connected to said control unit for applying to the latter said actuating signal, and a feedback network connecting the output of said servoamplifier to the input thereof for feeding back said actuating signal to said input of said servoamplifier, and switchover means operative in dependence upon said actuating signal for changing the conductance of said feedback network in a sense counteracting the effect of said error signal upon said actuating signal.

2. A servosystem as defined in claim 1, wherein said switchover means is operative for changing the conductance of said feedback network in dependence upon the polarity of said actuating signal.

3. A servosystem as defined in claim 1, wherein said switchover means is operative for changing the conductance of said feedback network in dependence upon the amplitude of said actuating signal.

4. A servosystem, comprising in combination, an energy-storing controlled system having an output variable which is to be maintained at a predetermined value; energy-varying means operative for effecting a change in the energy stored by said energy-storing controlled system; an on-off control unit operative in the on mode thereof for causing said energy-varying means to effect a change in the energy stored by said controlled system and operative in the off mode thereof for preventing said energy-varying means from effecting such change, error-indicating means operative for generating an error signal indicative of the deviation of said output variable from said predetermined value; and pulse-duration-modulating means connected to said error-indicating means for receiving said error signal and operative for alternatively turning said control unit on and off by applying to said on-off control unit an error-signal-dependent pulseduration-modulated actuating signal whose dependence upon said error signal is such that increases in the deviation indicated by said error signal result in superproportional increases in the ratio of the on-time to the off-time of said pulse-duration-modulated actuating signal, wherein said pulse-duration-modulating means comprises a servo-amplifier having an input connected to said error-indicating means for receiving said error signal and having an output connected to said control unit for applying to the latter said actuating signal, and a two-time-constant feedback network connecting the output of said servoamplifier to the input thereof for feeding back the output signal thereof to the input thereof in a time-delayed manner, and switchover means operative for effecting changes back and forth between the two time constants of said feedback network in dependence upon said actuating signal.

5. A servosystem as defined in claim 4, wherein said switchover means comprises means operative for effecting changes back and forth between the two time constants of said feedback network in dependence upon the polarity of said actuating signal.

6. A servosystem as defined in claim 4, wherein said switchover means is operative for effecting changes back and forth between the two time constants of said feedback network in dependence upon the amplitude of said actuating signal.

7. A servosystem as defined in claim 6, wherein said servoamplifier is an operational amplifier, and wherein said feedback network is comprised of a plurality of resistors and a time-delay capacitor, and wherein said operational amplifier is operative for generating at its output a signal of polarity opposite to the input signal thereof, and wherein said switchover means comprises a diode shunting at least one of said resistors up-circuit of said capacitor.

8. A servosystem as defined in claim 7, wherein said diode has such a polarity as to become conductive when the pulse-duration-modulated actuating signal applied to said control unit has an amplitude causing said energy-varying means to supply energy to said controlled system.

9. A servosystem as defined in claim 7, wherein the conduction-threshold voltage of said diode determines the steady-state effective value of said actuating signal.

10. A servosystem as defined in claim 7, wherein said feedback network further includes a coupling capacitor shunting at least one other of said resistors.

* * * * *